R. M. WENGLER.
METHOD AND APPARATUS FOR CLASSIFYING ORES.
No. 170,422. Patented Nov. 23, 1875.
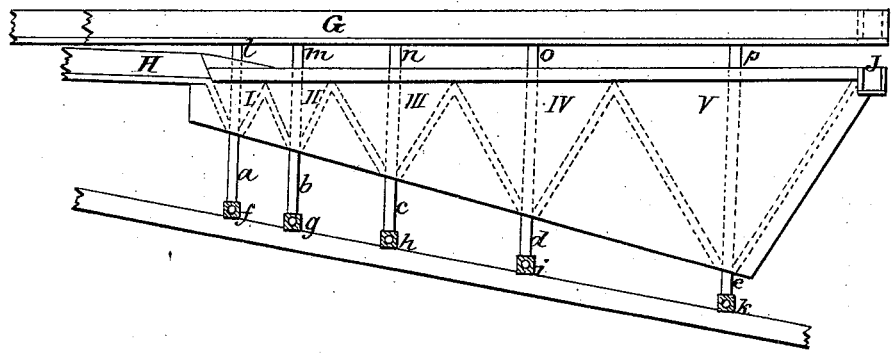
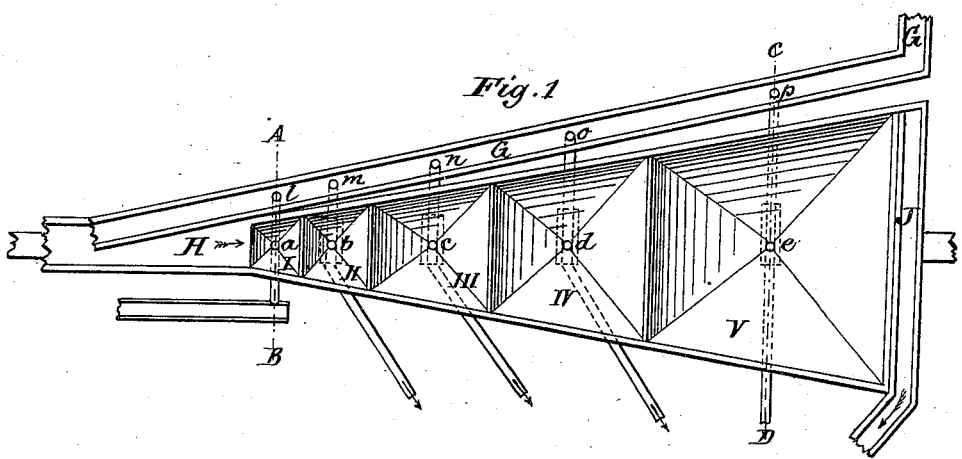
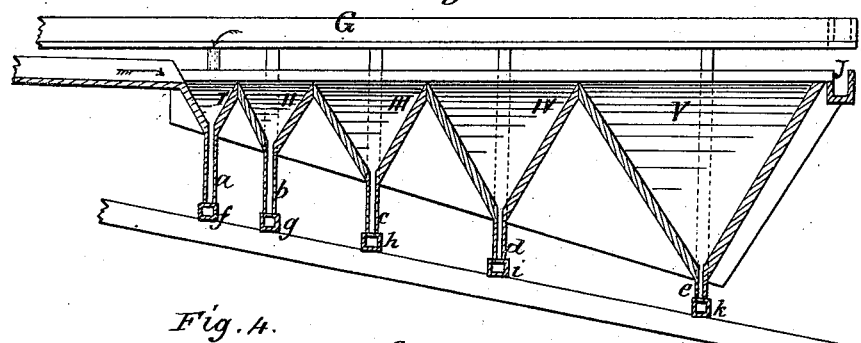
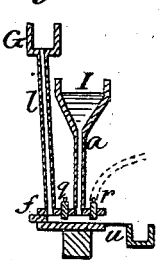
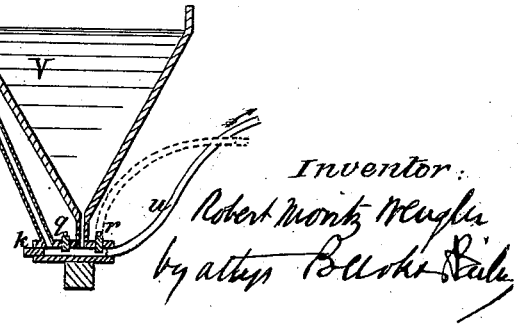
Witnesses:
Ewell A. Dick
Henry R. Elliott
Inventor:
Robert Moritz Wengler
by attys Baldwin Hale

UNITED STATES PATENT OFFICE.

ROBERT M. WENGLER, OF FREIBERG, SAXONY, ASSIGNOR OF ONE-HALF HIS RIGHT TO FRANCIS A. LOWE, OF WASHINGTON, D. C.

IMPROVEMENT IN METHODS AND APPARATUS FOR CLASSIFYING ORES.

Specification forming part of Letters Patent No. 170,422, dated November 23, 1875; application filed October 30, 1875.

*To all whom it may concern:*

Be it known that I, ROBERT MORITZ WENGLER, of Freiberg, in the Kingdom of Saxony, have invented a certain new and useful Improvement in the Method of, and Apparatus for, Classifying Ores, and ridding them of their slime, which improvement is fully set forth in the accompanying specification, reference being had to the accompanying drawing, in which—

Figure 1 is a plan, Fig. 2 an elevation, and Fig. 3 a longitudinal vertical central section, of an apparatus adapted for the purposes of my invention. Fig. 4 is a transverse vertical section through the first and smallest vessel and its appurtenances. Fig. 5 is a like section through the last and largest vessel and its appurtenances.

The object of my invention is to classify, with a view to final concentration, low-grade ores and tailings; and this I accomplish through the instrumentality of apparatus substantially such as hereinafter described, by which the stamped ore can be perfectly separated from its slime, and classified regularly, and to almost any fineness.

In carrying out my invention, I employ a series of vessels, preferably of reversed pyramidal shape, gradually increasing in size, which vessels, when full, are in communication with one another. They are shown in the drawing from I to V. From the bottom of each vessel there extends a tube, as shown at $a$, $b$, $c$, $d$, and $e$, and each tube is connected with a tubular foot-piece, as shown at $f$, $g$, $h$, $i$, and $k$. From a trough, G, situated some distance above the apparatus, a series of five tubes, $l$ $m$ $n$ $o$ $p$, extend down and connect each with one of the foot-pieces. The trough G serves as a clear-water conduit, to supply water to the tubes $f$ $g$ $h$ $i$ $k$. I provide on each of the tubes last named small sluices or gates $q$ and $r$, intermediate between which is the lower end $a$, $b$, $c$, $d$, or $e$ of the vessel which open into the tube. The sluices serve to regulate the influx of water and the efflux of the grains or kernels of ore. The trough H serves as a conduit for the stamped material as it comes from the stampers. At the other end of the apparatus is another trough, J, which carries off the slime.

The *modus operandi* is as follows: The water in the trough G is, as above stated, above the level of that in the main portion of the apparatus, and it therefore has a more powerful head. Consequently, if the sluices be so adjusted that the efflux-opening at $r$ be smaller than the influx-opening at $q$, then a part of the pure water, which would otherwise flow out at $r$, will react upon and against the downward current in, for instance, the tube $a$. It will, therefore, be seen that it is possible for such kernels or grains only whose weight is greater than the resistance of the upwardly-reacting stream to flow out at $r$, the other and finer ore, together with slime, flowing over into section I I, where the same operation is repeated, only on a finer scale, and so on to the last section or vessel, which receives all the slime and the ore of ultimate fineness. Here the operation is again gone through with, and, by a simple adjustment of the sluices of this last section, all the slime is caused to pass over into the trough J mechanically mixed, with a loss of about four per cent. of ore—a loss so small, compared with the percentage gained, that no account is taken of it.

The separation of the different kernels or grains can be accurately regulated, inasmuch as the slightest movement of the sluices has a remarkable influence on the classification, and, according as the reacting stream is stronger or weaker, the grains separated thereby from the mass of stamped ore, will be correspondingly coarser or finer.

The graded or classified ore, as it passes out of the tubes $u$, is carried to its proper place of concentration.

Having described my invention, what I claim, and desire to secure by Letters Patent, is—

1. The described process of separating, from a mass of stamped or granulated material, grains or kernels of a given size or weight by means of an upwardly-reacting current or stream of water, which acts upon or against a downwardly-tending column of water of less head containing the stamped or granulated material in suspension, substantially in the manner set forth.

2. The method of classifying, with a view to their final concentration, low-grade ores and tailings, by passing the same, mingled with water, through a series of vessels or tanks, in which the downwardly-tending columns of water are acted on by upwardly-reacting currents or streams of water of superior head, whose reacting force is diminished in each succeeding vessel or tank, substantially in manner and for the purposes set forth.

3. The classifying apparatus, consisting of a series of vessels or tanks arranged to communicate, as described, in combination with the foot-pieces, sluices or gates, and pure-water conduits, for operation substantially as shown and set forth.

In testimony whereof I have hereunto signed my name this 19th day of June, A. D. 1875.

ROBERT MORITZ WENGLER.

Witnesses:
L. BRENTANO,
WM. WÜRDEMANN.